F. McCRAKEN.
AUTOMATIC STOCK WATERING DEVICE.
APPLICATION FILED JUNE 3, 1913.
1,126,806.
Patented Feb. 2, 1915.
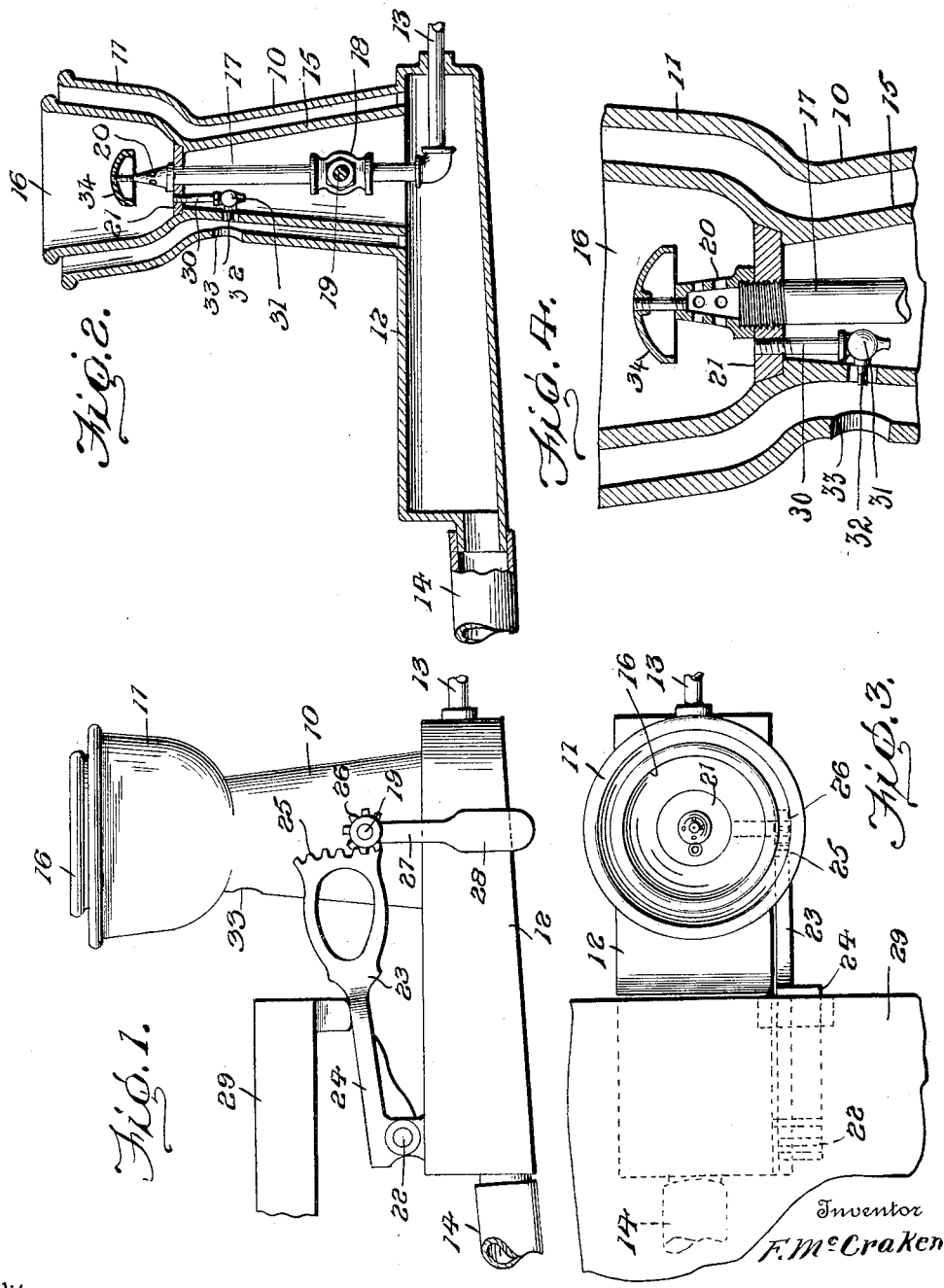

UNITED STATES PATENT OFFICE.

FRANK McCRAKEN, OF SAN FRANCISCO, CALIFORNIA.

AUTOMATIC STOCK-WATERING DEVICE.

1,126,806.  Specification of Letters Patent.  Patented Feb. 2, 1915.

Application filed June 3, 1913. Serial No. 771,543.

*To all whom it may concern:*

Be it known that I, FRANK MCCRAKEN, a citizen of the United States, residing at San Francisco, in the county of San Francisco and State of California, have invented certain new and useful Improvements in Automatic Stock-Watering Devices, of which the following is a specification.

This invention relates to improvements in automatic stock watering devices of the class wherein the weight of the animal is utilized to turn on the supply of water, and which is automatically shut off when the animal leaves the operating platform.

Another object of the invention is to provide a simply constructed device which may be readily adapted without material structural change, except as to size, to animals of different species, and wherein fresh water is supplied to each animal and the accumulation of foreign matter in the water effectually prevented.

With these and other objects in view the invention consists in certain novel features of construction as hereinafter shown and described and then specifically pointed out in the claims, and in the drawings illustrative of the preferred embodiment of the invention.

Figure 1 is a side elevation. Fig. 2 is a longitudinal sectional elevation. Fig. 3 is a plan view of the improved device with the deflector removed. Fig. 4 is a sectional detail of the supply nozzle.

Corresponding and like parts are referred to in the following description and indicated in all the views of the drawings by the same reference characters.

The improved device is designed to be associated with a platform to which animals are caused to pass to reach the water receptacle, and arranged to tilt slightly and thus actuate a valve to cause the water to flow to a drinking receptacle, the platform automatically returning to its former position and shutting off the water when the animal retires.

Any desired form of tilting platform may be employed and it is not desired to limit the invention in any manner to any specific form of the platform, as the construction of the platform is not a part of the present invention. The improved device may be employed for watering stock of different sizes and species and is equally adapted for the largest weight of cattle or the smaller animals, such as sheep, hogs or poultry.

The improved device comprises an outer tubular casing including a vertical portion 10 preferably slightly tapered toward the upper end and enlarged into a drainage bowl 11 at the upper end and connected into a hollow base 12. The base portion extends substantially in a horizontal direction and the water supply pipe 13 leads into the base at one end while a drainage conduit 14 leads from the pipe at the other end.

Located within the tubular portion 10 of the casing is an inner tubular member 15 and is also slightly tapered and enlarged at its upper end into a water receptacle or a bowl 16. The walls of the inner tube 15—16 conform substantially to the walls of the outer casing 10—11 and are spaced substantially at uniform distances therefrom as shown, so that an annular space is left between the inner tubular member 15—16 and the outer casing 10—11. The bowl 16 extends preferably a short distance above the upper edge of the bowl 11 as shown. The tubular members 10—15 communicate with the interior of the base 12 as shown.

The supply pipe 13 is provided with an upwardly directed branch 17 having a controlling valve 18 connected therein with the stem 19 of the valve extending through one side of the members 10—15. At its upper end the branch 17 of the supply pipe is provided with a nozzle device 20 which bears upon a supporting plate 21, the latter having beveled edges to engage in a beveled seat located between the bowl portion 16 and the tubular portion 15. A drainage pipe 30 is connected into the plate 21 and is provided with a pet-cock 31 having a stem 32 which extends through an aperture in the member 15.

Located in the member 10 opposite the stem 32 is a hand-hole 33 through which a suitable implement may be extended to actuate the stem 32. By this means the bowl 16 may be drained when required.

At its upper end the nozzle 20 is provided with a downwardly directed deflector member 34 against the underside of which the rising water is received and deflected and thus prevented from flowing with too great force over the upper edge of the bowl.

Pivoted at 22 upon the base 12 is an arm represented as a whole at 23, and including a laterally extended flat portion 24 and a gear segment 25 which engages with a gear segment 26 upon the stem 19 of the valve. Depending from the segment 26 is another arm 27 enlarged into a weight 28 at its free end, the weight 28 thus exerting its force to maintain the arm 27 in its downward or vertical position, and holding the plug of the valve in closed position and shutting off the water. The segment 25 is so arranged that when the weighted arm is in its downward position and the valve closed the segment will be located in its upward position, as shown in Fig. 3, and then when the lever 23 is depressed the valve stem 19 will be rotated one fourth of a revolution through the coaction of the segments 25—26. A portion of the tilting platform is represented at 29 and is arranged to contact with the laterally enlarged portion 24 of the lever 23. The weight 28 will be sufficient to maintain the platform 29 in its elevated position when no weight is applied thereto, and thus hold the valve normally closed. When an animal approaches to drink, the platform 29 is depressed with the result of correspondingly depressing the lever 23 and causing the segment 25 to rotate the segment 26 against the resistance of the weight 28 and thus open the valve and permit the water to flow into the bowl 16. The water continues to flow until it fills the bowl and flows over the edge into the larger bowl 11, the animal being thus supplied with constantly running water so long as it remains upon the platform.

The flow of water maintains the bowl in constant purified condition and effectually prevents the accumulation of germs or other foreign matter. Each animal is thus supplied with fresh water, and as soon as the animal retires from the platform the water is automatically shut off, but leaving the bowl 16 full of water to prevent waste. In event of repairs being required the bowl 16 may be quickly drained by actuating the valve 31.

The improved device is simple in construction, can be inexpensively manufactured and applied and constructed of any required size by simply enlarging or decreasing the sizes of the parts to adapt the device to animals of different sizes and weights.

All of the parts, except the tilting platform, are of metal and readily separable for cleansing or repairs. The improved device may be thus maintained in perfect sanitary condition and easily treated by disinfecting compounds as required.

Having thus described the invention, what is claimed as new is:

1. A stock watering device comprising a hollow waste way, a tubular casing communicating with the waste way and enlarged at the upper end, a tubular member within the casing and enlarged into a receiving bowl within the enlargement of the casing and communicating with the waste way, a draw-off controlled by a valve and discharging into the waste way, and means for supplying water to the receiving bowl.

2. In a device of the class described, an outer casing communicating with a waste way, an inner casing within the outer casing and spaced therefrom and communicating with the waste way, said inner casing being enlarged at the upper end into a receptacle and said inner casing having a seat at the lower end of the receptacle, a plate engaging said seat, a supply pipe extending through said plate, a nozzle upon the supply pipe above the plate, and a controlling valve in said supply pipe.

3. In a stock watering device, a casing, a receiving bowl within the casing, a supply pipe leading into the bowl, a controlling valve connected into the supply pipe and having the stem extending from the casing, a pinion and a weighted arm connected to the stem, said arm operating to maintain the valve normally closed, an arm pivoted at one end and with a segment at the other end engaging said pinion, and means operative by an animal for depressing said arm to cause said valve to be opened.

4. A stock watering device comprising a tubular member enlarged at the upper end into a receiving bowl with a seat at the juncture of the receiving bowl and tubular member, a plate engaging said seat, a supply pipe discharging into said bowl and having an enlargement bearing upon said plate and holding the same upon its seat, and a drainage device connected to said plate.

5. A stock watering device comprising a tubular member enlarged at the upper end into a receiving bowl with a seat at the juncture of the receiving bowl and tubular member, a plate engaging said seat, and a supply pipe discharging into said bowl and having an enlargement bearing upon said plate and holding the same upon its seat.

In testimony whereof I affix my signature in presence of two witnesses.

FRANK McCRAKEN. [L. S.]

Witnesses:
E. J. TALBOTT,
A. C. HENNING.

Copies of this patent may be obtained for five cents each, by addressing the "Commissioner of Patents, Washington, D. C."